> United States Patent Office 3,318,927
Patented May 9, 1967

3,318,927
ALKYLATED ESTRADIOL
Georg Anner and Jaroslav Kalvoda, Basel, and Peter Wieland, Oberwil, Basel-Land, Switzerland, assignors to Ciba Corporation, New York, N.Y., a corporation of Delaware
No Drawing. Filed Dec. 21, 1964, Ser. No. 420,147
Claims priority, application Switzerland Dec. 24, 1963, 15,945/63; May 27, 1964, 6,914/64; Dec. 3, 1964, 15,653/64
2 Claims. (Cl. 260—397.5)

The present invention relates to the manufacture of 7α-methyl-oestradiol of the formula (I)
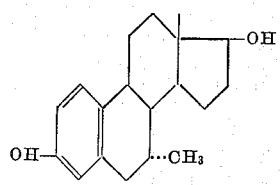

The new compound possesses valuable pharmacological properties. Inter alia, more especially in the castrated female rat on subcutaneous administration both in the Allen-Doisy test (keratinization of the vagina) and in the Bülbring-Burn test (uterous growth) its oestrogenic action is four times as high as that of oestradiol. On oral administration with a stomach tube to castrated female rats in the Allen-Doisy test the oestrogenic effect observed is three times that of oestradiol. Accordingly, the new compound may be used as a potent oestrogen.

The new compound is accessible by known methods, more especially by aromatization of the ring A in a compound of the formula (II)
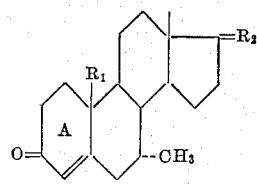

in which $R_1$ represents a hydrogen atom, a free or esterified hydroxyl group or a methyl or hydroxymethyl group, and $R_2$ represents a hydroxyl group or a radical convertible into a hydroxyl group, primarily an oxygenated radical, for example a free or functionally converted hydroxyl group together with a hydrogen atom, or a free or functionally converted oxo group, and which may contain a further double bond in the 1,2-position, optionally followed by conversion of the 17-substituent into a free hydroxyl group. Thus, for example, a 19-unsubstituted $\Delta^{1,4}$-3-oxo-7α-methylandrostadiene of the above formula may be aromatized by pyrolysis in the ring A. For this purpose the said starting material is heated in the presence or absence of a solvent or diluent, e.g. a mineral oil or a cyclic hydrocarbon, such as 9,10-dihydrophenanthrene, for example, at 200 to 600° C. According to another aromatizing method the afore-said 19-unsubstituted $\Delta^{1,4}$-3-oxo-7α-methylandrostadiene is treated with lithium and diphenyl in the presence of diphenylmethane by the method described in the Journal of the American Chemical Society 86, page 742 [1964]. This treatment is preferably performed with the use of tetrahydrofuran as solvent.

On completion of the aromatization the substituent in the 17-position may be converted into the free hydroxyl group by a known method.

Alternatively, the new compound can be manufactured by pyrolyzing a $\Delta^4$-3-oxo-7α-methyl-10-acyloxy-19-norandrostene of the above Formula II and, if necessary, conversion of the 17-substituent into a free hydroxyl group. In these starting materials the acyloxy group is above all that of a carboxylic acid, e.g. of a lower aliphatic or aromatic carboxylic acid, for example of the acetic trifluoroacetic or benzoic acid. According to this invention the 10-acyloxy group is eliminated by heating the starting material, advantageously to a temperature above 80° C., preferably in vacuo, or by heating for a short time in a high-boiling solvent or diluent, especially a hydrocarbon or ether, such as toluene, xylene, tetraline, decaline, dioxane, anisole or diethylene glycol dimethyl ether.

According to another variant the new compound is obtained by treating a $\Delta^{1,4}$-3-oxo-7α-methyl-19-hydroxy-androstadiene of the above Formula II with an acid or a base and, optionally, converting the substituent in the 17-position into a free hydroxyl group. Acids preferably used for this treatment are mineral acids, such as hydrochloric, sulphuric or chlorosulphonic acid, or a carboxylic acid such as formic, acetic or propionic acid, and as bases, for example, alkali metal hydroxides such as sodium or potassium hydroxide, or a nitrogen base such as pyridine or dimethylformamide. If the selected acid or basic agent is one that does not dissolve the starting materials, the reaction is advantageously carried out in a solvent, e.g. in a hydrocarbon, alcohol, ether or ketone such as benzene, xylene, methanol, ethanol, dioxane or acetone.

Starting from a compound of the above Formula II in which $R_1$ represents a hydrogen atom, the 7α-methyl-oestradiol can be prepared by treating with a dehydrogenating agent, preferably one that is capable of introducing double bonds in positions 1,2 or 1,2 and 4,5 of 10-methylsteroids. To these agents belong quinones, especially 2,3-dichloro-5,6-dicyano-benzoquinone or chloranil, or selenous acid and its derivatives such as selenium dioxide or dibenzoyloxy selenium oxide. This dehydrogenation is performed in the usual manner, for example in a solvent, advantageously in an ether or alcohol, such as dioxane, tetrahydrofuran, ethanol or tertiary butanol, and advantageously at an elevated temperature. Alternatively, the said starting compounds may be treated with microorganisms capable of introducing a double bond in the 1,2-position of a steroid, e.g., with *Corynebacterium simplex, Didymella lycopersici, Bacillus subtilis* or *Septomyxa affinis*. If necessary, this treatment is followed by conversion of the 17-substituent into a free hydroxyl group.

According to another process for the manufacture of the new compound of the present application a $\Delta^4$-3-oxo-6β-halogeno-7α-methyl-19-norandrostene of the formula (III)
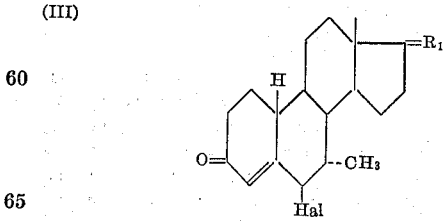

3 in which $R_2$ has the above meaning and Hal represents a halogen atom, especially bromine, is reacted with an acid and, if necessary, the substituent in position 17 is converted into a free hydroxyl group. It is advantageous to use a strong acid, preferably a mineral acid, e.g., one of those mentioned above. The reaction of this process may be carried out in one of the solvents mentioned above. Particularly good results are obtained when the reaction is performed with hydrochloric acid in acetone.

Furthermore, the new compound can be prepared from a $\Delta^{1,4,9(11)}$-3-oxo-7α-methylandrostatriene of the formula (IV)

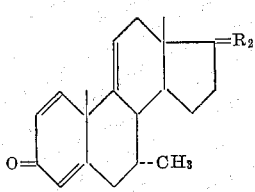

where $R_2$ has the above meaning, by treatment with zinc and hydrogenating the resulting $\Delta^{1,3,5(10)9(11)}$-3-hydroxy-7α-methyl-oestratetraene and, if necessary, conversion of the substituent $R_2$ into the free hydroxyl group. If desired, the hydrogenation may be performed only after the last-mentioned conversion. The treatment with zinc is advantageously carried out in aqueous pyridine, e.g., in a 9:1-mixture of pyridine and water, or in an alkanol or glycol such as ethanol or ethyleneglycol. The hydrogenation is preferably performed with catalytically activated or nascent hydrogen, e.g., hydrogen and a palladium catalyst, or sodium or potassium in liquid ammonia.

Finally, the new compound can also be manufactured by the following novel process which enables the stereospecific introduction of the 7α-methyl group to be performed. According to this method the 6,7β-epoxide of a $\Delta^{1,3,5(10)}$-oestratriene of the formula (V)

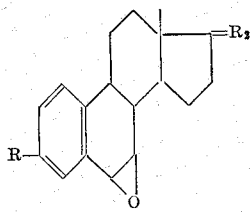

where R represents a free or functionally converted, for example esterified or etherified, hydroxyl group and $R_2$ has the above meaning, is reacted with a methyl metal compound, e.g., a methyl magnesium halide, especially methyl magnesium bromide or iodide or with lithium methyl, whereupon in the resulting 6-hydroxy-7α-methyl compound the hydroxyl group is eliminated, if desired after having esterified it and, if desired, the groups present in positions 3 and 17 are converted into free hydroxyl groups in the known manner. The reaction according to this invention with the methyl magnesium halide is advantageously carried out in an ether such as diethyl ether, tetrahydrofuran or dioxane, or in an aromatic hydrocarbon such as benzene. The hydrogenolytic elimination of the hydroxyl group in the 6-hydroxy-7α-methyl compound is advantageously performed with catalytically activated or nascent hydrogen. The 6-hydroxyl group can, if desired, be esterified, for example with a reactive functional derivative of a carboxylic or sulphonic acid, e.g., one of those mentioned above, and then eliminated hydrogenolytically, for example with Raney nickel.

A functionally converted hydroxyl group in the 17-position of the above-mentioned starting materials is, for example, a hydroxyl group esterified with an organic carboxylic or sulphonic acid, especially one that contains at most 20 carbon atoms, e.g., formic, acetic, propionic, butyric, valeric, caproic, trimethylacetic, undecylenic, cyclopropylcarboxylic, cyclopentylcarboxylic, cyclohexylacetic, phenylacetic, phenylpropionic, phenoxyacetic, acetoacetic, diethylaminoacetic, glycollic, bisglycollic, aspartic, benzoic, ortho-sulphobenzoic, furan-2-carboxylic or nicotinic acid or with methanesulphonic, ethanesulphonic, benzenesulphonic or toluenesulphonic acid, or a hydroxyl group etherified with a lower aliphatic alcohol such as methanol or ethanol, an araliphatic alcohol such as benzyl alcohol, or with a heterocyclic alcohol such as tetrahydropyranol. A functionally converted oxo group is, for example, a ketalized oxo group, an oxime or a hydrazone group.

In all reactions referred to above the conversion of a 17-oxygenated substituent into the free hydroxyl group is carried out in the usual manner. Thus, an esterified or etherified hydroxyl group can, for example, be split by hydrolysis or hydrogenolysis. A ketalized oxo group can be liberated, for example, by acid hydrolysis and then reduced to the hydroxyl group by a known method. Similarly, a functionally converted, for example, etherified or esterified, hydroxyl group in position 3 of a resulting 7-methyloestradiol derivative can be converted into the free hydroxyl group by a known method.

Most of the starting materials are known; those which are new can be prepared by known methods. Thus, for example, the $\Delta^4$-3-oxo-7α-methyl compounds of the androstane and 19-norandrostane series of the above Formulae II, III and IV are accessible from the corresponding 7-unsubstituted $\Delta^{4,6}$-3-oxo-androstadienes or -19-norandrostadienes by treatment with methyl magnesium iodide in the presence of cuprous chloride or cupric acetate and subsequent hydrolysis. The resulting products can be dehydrogenated in the 1,2-position by means of selenium dioxide or a quinone, especially 2,3-dichloro-5,6-dicyanobenzoquinone, in an alcohol such as tertiary butanol or pentanol, or with the aid of enzymes of fungi of the genus Fusarium, Didymella, Corynebacterium or *Bacillus subtilis* or *sphaericus* and, if desired, before or after dehydrogenation hydroxylated in position 19 with enzymes of fungi of the genus Corticium or Pericularia. $\Delta^4$-3-oxo-7α-methyl-10-acyloxy-19-norandrostenes can be prepared by reacting $\Delta^4$-3-oxo-7α-methyl-19-hydroxyandrostenes with a lead tetraacylate, especially lead tetraacetate, in a nonpolar solvent such as benzene or cyclohexane. $\Delta^4$-3-oxo-6β-halogeno-7α-methyl-19-norandrostenes are accessible from 3-enolethers of the said $\Delta^4$-3-oxo-7α-methyl-19-norandrostenes by reacting with N-halocarboxylic acid amides or imides, such as N-bromoacetamide or -succinimide.

The 6,7β-epoxides of the Formula V used in the present new process can be obtained from the corresponding $\Delta^{1,3,5(10),6}$-oestratetraenes by reaction with N-halocarboxylic acid amides or imides, e.g., those mentioned above, and treatment of the resulting 6,7-halohydrins with alkalis, advantageously with potassium hydroxide in aqueous dioxane. If the starting materials contain oxo groups, the latter can, if desired, be ketalized in the known manner, e.g., with lower alkanols or glycols, such as methanol or ethyleneglycol.

The new compound is suitable for use as a medicament in the form of pharmaceutical preparations in conjunction or admixture with solid or liquid organic or inorganic pharmaceutical excipients suitable for enteral, e.g., oral, or parenteral administration. Suitable excipients are substances that do not react with the new compound, e.g., water, gelatin, lactose, starches, magnesium stearate, talcum, vegetable oils, benzyl alcohols, gums polyalkylene glycols, cholesterol or other known medicinal excipients. The pharmaceutical preparations may be, for example, tablets, dragees or capsules, or in liquid form solutions, suspensions or emulsions. They may be sterilized and/or may contain assistants such as preserving, stabilizing, wetting or emulsifying agents, salts for regulating the osmotic pressure or buffers. They may also contain further therapeutically valuable substances.

In these pharmaceutical preparations the amount of the active estrogenic substance is preferably within the range of 0.01 mg. and 0.25 mg. per unit dose.

The following examples illustrate the invention.

EXAMPLE 1

A solution of methyl magnesium iodide (prepared by reacting a solution of 3.8 ml. of methyl iodide in 20 ml. of ether upon 1.200 g. of magnesium chips) is mixed, while being stirred, with a solution of 500 mg. of $\Delta^{1,3,5(10)}$-3-methoxy-6,7β-oxido-17β-hydroxyoestratriene in 10 ml. of ether and 30 ml. of benzene. Another 50 ml. of benzene are then added to the reaction mixture, the ether is distilled off (boiling point of the mixture is about 75° C.) and the residue refluxed for 6 hours. The resulting suspension is cooled, diluted with ether and, while being vigorously stirred, saturated ammonium chloride solution is stirred in; the organic solution is washed with water, dried and evaporated in a water-jet vacuum. The amorphous residues (510 mg.) consists of a mixture of two isomeric diols, contaminated with traces of starting material and a small share of phenolic products. By chromatography on alumina (activity II) the two isomers are easy to separate, since one of them eliminates water and is thereby transformed into 3 - methoxy - 6 - methyl - 17β-hydroxy-$\Delta^{1,3,5(10),6}$-oestratetraene and is eluted already in the first fractions. Polar mixtures (benzene+ethyl acetate) then elute the desired $\Delta^{1,3,5(10)}$-3-methoxy-6,17β-dihydroxy-7α-methyl-oestratriene (255 mg.) which is subjected to hydrogenolysis without first having been purified. For this purpose the crude product is dissolved in methanol and hydrogenated with the use of palladium carbon of 10% strength as catalyst. When 1.1 mols of hydrogen have been absorbed, the reaction is discontinued, the catalyst filtered off and the filtrate evaporated in a water-jet vacuum. The resulting crude 7α-methyloestradiol-3-methyl ether is treated in the usual manner with pyridine hydrochloride, whereupon a yield of about 60% of crude 7α-methyl-oestradiol is obtained. The compound crystallizes from ether as a solvate in colorless prisms which melt at 119° C. to 120° C., accompanied by elimination of ether.

The $\Delta^{1,3,5(10)}$-3-methoxy-6,7β - oxido-17β-hydroxy-oestratriene used as starting material can be prepared in the following manner:

A solution of 2.0 g. of sodium hydroxide in 4 ml. of water is added at about 15 to 20° C. within 30 minutes to a suspension of 3.90 g. of 6-dehydro-oestrone in a mixture of 14 ml. of methanol and 10 ml. of methylenechloride. While stirring the batch vigorously, 5.6 ml. of dimethyl sulphate are added dropwise within 90 minutes, another 2.5 g. of sodium hydroxide in 5 ml. of water and 4.8 ml. of dimethylsulphate are added, and the methylenechloride used as solvent is then distilled off. On addition of water, the 3-methyl ether formed precipitates; after having been recrystallized from methylenechloride+methanol it melts at 118 to 120° C. Yield: 3.4 g.

A stirred solution of 2.0 g. of the resulting 6-dehydro-oestrone methyl ether in 150 ml. of ether is mixed at about 15° C. with 3.5 ml. of perchloric acid of 8% strength and 1.40 g. of N-bromoacetamide. The reaction mixture is stirred for 30 minutes at 20° C., then diluted with ether and water, and the ethereal solution is washed with a 10% potassium iodide and 10% sodium thiosulphate solution and with water, dried and evaporated in a water-jet vacuum at about 30° C. Yield: 2.9 g. sulphate solution and with water, dried and evaporated 2.9 g. of the amorphous evaporation residue are then dissolved in 25 ml. of dioxane, 2.0 g. of potassium hydroxide in 12.5 ml. of water are added, and the whole is stirred for 35 minutes at 80° C. The cooled mixture is mixed with water, the precipitate filtered off, washed with water and taken up in methylenechloride+ether, and the solution is dried over sodium sulphate and evaporated in a water-jet vacuum. The resulting crystalline 6,7β-oxido-oestrone-3-methyl ether (1.423 g.) melts at 177 to 180° C. after one recrystallization from a mixture of methylene chloride, ether and petroleum ether.

A solution of 980 mg. of the above compound in 50 ml. of tetrahydrofuran is added to a solution of 2.0 g. in lithium tri-tertiary butoxy-aluminium hydride in 100 ml. of freshly distilled tetrahydrofuran. The mixture is stirred for 2 hours at 5° C. under nitrogen, then—while being thoroughly cooled—cautiously mixed with 1 ml. of acetone in 10 ml. of tetrahydrofuran and with 1 ml. of water in 10 ml. of tetrahydrofuran, the inorganic matter is filtered off and the filtrate evaporated in a water-jet vacuum. The evaporation residue is dissolved in a 1:5-mixture of methylene chloride+ether, the solution is successively washed with saturated Seignette salt solution and water, dried and evaporated in a water-jet vacuum. The resulting crystalline crude product (975 mg.) yields on recrystallization from methylene-chloride+ether 778 mg. of pure $\Delta^{1,3,5(10)}$-3-methoxy-6,7β-oxido-17β-hydroxy-oestratriene melting at 119 to 120° C. From the mother liquors another 76 mg. of the same product can be obtained.

EXAMPLE 2

A mixture of 2.0 g. of lead tetraacetate, 2.0 g. of calcium carbonate and 200 ml. of absolute benzene is boiled for a short time and then allowed to cool. 2.0 g. of $\Delta^4$-3,17-dioxo-7α-methyl - 19 - hydroxyandrostene are then added and the whole is refluxed for 12 hours, cooled to 25° C., the undissolved matter is filtered off, and the filtrate is successively washed with water, 5% potassium iodide and 5% sodium thiosulphate solution and once more with water, dried and evaporated in a water-jet vacuum. The resulting crude product is suspended in 50 ml. of Decalin, and the suspension is heated for 45 minutes at 150° C. The reaction mixture is slowly cooled to 20° C., and the precipitated 7α-methyloestrone (1.15 g.) is suctioned off, rinsed with a 1:1-mixture of ether+petroleum ether and dried in vacuo. After having been reduced with excess lithium aluminium hydride in tetrahydrofuran the compound gives an 80% yield of 7α-methyloestradiol melting at 118 to 120° C. It is in every respect identical with the products described in Example 1.

The $\Delta^4$-3,17-dioxo - 7α - methyl-19-hydroxyandrostene used as starting material can be manufactured, for example, as follows:

Reduction of the enolacetate of $\Delta^4$-3-oxo-7α-methyl-17β-acetoxyandrostene with sodium borohydride furnishes $\Delta^5$-3β-hydroxy - 7α - methyl-17β-acetoxyandrostene which is converted into $\Delta^4$-3,17-dioxo-6,19β-oxido-7α-methylandrostene by acetylation, additive reaction with hypochlorous acid with the $\Delta^5$-double bond, subsequent reaction with lead tetraacetate-iodine in cyclohexane, hydrolysis of the acetoxy residues in the resulting 3,17β-diacetoxy-5α-chloro - 6,19β - oxido - 7α - methylandrostane, followed by oxidation to the 3,17-diketone and elimination of hydrochloric acid by heating with pyridine. 1.0 g. of this $\Delta^4$-3,17-dioxo-6,19β-oxido-7α-methylandrostene furnishes on being heated with zinc dust in aqueous glacial acetic acid 760 mg. of pure $\Delta^4$-3,17-dioxo-7α-methyl-19-hydroxyandrostene.

EXAMPLE 3

A solution of 500 mg. of $\Delta^4$-3-oxo-7α-methyl-17β-acetoxy-19-norandrostene in 4 ml. of absolute dioxane, 0.8 ml. of orthoformic acid ethyl ester and 0.04 ml. of absolute ethanol is mixed with 0.2 ml. of a solution of 0.25 ml. of concentrated sulphuric acid in 5 ml. of dioxane, and the whole is stirred for 20 minutes at 20° C. 0.5 ml. of pyridine is added and the solvent is evaporated in a water-jet and then in a high vacuum, the residue is mixed with water and ether, and the organic layer once more washed with water, dried and evaporated in a water-jet vacuum, to yield 590 mg. of a yellow oil which on chromatography on neutral alumina (activity II) furnishes 303 mg. of crystalline $\Delta^{3,5}$-3-ethoxy-7α-methyl-17β-acetoxy-19-norandrostadiene. The infrared spectrum of this compound contains bands, inter alia, at 5.80, 6.00, 6.15, 8.10, 8.03, 9.60 and 9.75μ. It is dissolved in 10 ml. of acetone without prior purification, mixed with a solution of 180 mg. of sodium acetate in 1.3 ml. of water, cooled to about −15° C., 255 mg. of N-bromosuccinimide and 0.2 ml. of glacial acetic acid are added, and the whole is stirred for 2 hours at −15 to −20° C. The reaction mixture is then successively mixed with a solution of 300 mg. of potassium iodide in 1.5 ml. of water, and 400 mg. of sodium thiosulphate in 2 ml. of water, the mixture is diluted with ether, and the organic layer is washed with water, dried and evaporated in a water-jet vacuum. The resulting crude $\Delta^4$-3-oxo-6-bromo-7α-methyl-17β-acetoxy-19-norandrostene is dissolved in 5 ml. of acetone, 2 drops of concentrated hydrochloric acid are added, and the mixture is refluxed for 2 hours. Usual working up yields amorphous 7α-methyloestradiol-17-acetate whose infrared spectrum contains bands, inter alia, at 2.82, 5.80, 6.20 (6.32), 6.68, 8.07, 9.60 and 9.75μ.

EXAMPLE 4

A solution of 296 mg. of crude 7α-methyl-oestradiol-17-acetate in 5 ml. of methanol, mixed with a solution of 350 mg. of potassium carbonate in 1.5 ml. of water, is kept for 15 hours at 20° C. The reaction mixture is then evaporated in a water-jet vacuum, the residue is mixed with water and ether and worked up in the usual manner. Subsequent chromatography on silica gel furnishes 149 mg. of pure 7α-methyl-oestradiol melting at 120° C. (from ether), and in addition 35 mg. of starting material. Optical rotation $[\alpha]_D^{25} = +68° \pm 2°$ (c.=0.480, in ethanol). The ultraviolet spectrum contains maxima at 220 mμ ($\epsilon$=8900) and 282 mμ ($\epsilon$=2600).

EXAMPLE 5

A solution of 250 mg. of lithium in a mixture of 4.6 g. of diphenyl and 25 ml. of tetrahydrofuran is mixed with 0.55 ml. of diphenylmethane and 1 g. of 3-oxo-7α-methyl-17-ethylenedioxy-$\Delta^{1,4}$-androstadiene, using 5 ml. of tetrahydrofuran for flushing. The whole is boiled for 2 hours with stirring under nitrogen, cooled with a mixture of ice+methanol, and 2.5 g. of ammonium chloride are added, whereupon the solution loses its color. 10 minutes later, 7.5 ml. of water and benzene are added. The batch is then washed with dilute sodium chloride solution, extracted with benzene, dried and evaporated under vacuum. The residue is mixed with 30 ml. of 90% acetic acid, and the flask—which is filled with nitrogen—is heated within 25 minutes from 60 to 80° C. The batch is then evaporated under vacuum and this operation is repeated once with benzene. The residue is chromatographed on 30 g. of alumina (activity II). Benzene elutes 7α-methyloestrone of which, after recrystallization with a mixture of methylenechloride+ether, a yield of 350 mg. is obtained. The product melts at 233 to 236° C.; it displays no melting point depression with an authentic reference material and has also an identical infrared spectrum.

A solution of 250 mg. of the 7-methyl-oestrone decribed above in 10 ml. of absolute tetrahydrofuran is added to a suspension of 150 mg. of lithium aluminium hydride in 10 ml. of tetrahydrofuran, using 10 ml. of tetrahydrofuran for flushing. The mixture is refluxed for 1 hour, then cooled to 0° C. and, while cooling it, 1 ml. of ethyl acetate in 5 ml. of tetrahydrofuran and then a solution of 0.5 ml. of water in 50 ml. of tetrahydrofuran are added. The inorganic material is then suctioned off the suspension, rinsed with tetrahydrofuran and then mixed with 5 g. of sodium sulphate. The combined filtrates are concentrated in a water-jet vacuum, and the resulting residue (230 mg.) is recrystallized from ether, to yield 180 mg. of 7α-methyl-oestradiol melting at 119 to 120° C.

EXAMPLE 6

*Pharmaceutical preparations containing 7α-methyl-oestradiol*

(a) A tablet containing 0.025 mg. 7α-methyl-oestradiol to be used as estrogenic preparation

| Ingredients: | Mg. |
|---|---|
| 7α-methyl-oestradiol | 0.025 |
| Lactose | 60.000 |
| Wheat starch | 20.000 |
| Colloidal silica acid with hydrolysed starch | 5.000 |
| Talc | 5.000 |
| Magnesium stearate | 0.500 |
| Arrowroot | 9.475 |
| | 100.000 |

(b) A tablet each containing 0.25 mg. of the 7α-methyl-oestradiol to be used as estrogenic preparation

| Ingredients: | Mg. |
|---|---|
| 7α-methyl-oestradiol | 0.250 |
| Lactose | 50.000 |
| Wheat starch | 30.000 |
| Gelatine | 1.000 |
| Talc | 5.000 |
| Magnesium stearate | 0.500 |
| Arrowroot | 13.250 |
| | 100.000 |

*Preparation.*—The mixture of the active ingredients, lactose and wheat starch is moistened with a solution containing the colloidal silicic acid or the gelatine to form a slightly plastic mass and then granulated in the usual manner. After being dried at 40° C., the mass is brought into the usual grain size by being passed through a sieve. Arrowroot, magnesium stearate and talc are added to the dried mass and the mixture is then compressed into tablets of 7 mm. diameter.

(c) 1000 linguettes each containing 0.025 mg. 7α-methyl-oestradiol

| Ingredients: | G. |
|---|---|
| 7α-methyl-oestradiol | 0.250 |
| Lactose | 100.000 |
| Saccharose | 229.975 |
| Stearic acid | 3.000 |
| Talc | 17.000 |
| | 350.000 |

*Procedure.*—The mixture of the active substance with lactose is moistened with an aqueous solution of saccharose and granulated in the usual manner. After being dried, the sieved granulate is mixed with stearic acid and talc and then compressed into linguettes.

(d) 100 oil ampoules each containing 0.1 mg. of 7α-methyl-oestradiol

Ingredients:
    7α-methyl-oestradiol _____ g__ 0.01
    Benzyl alcohol _____ ml__ 10.00
    Sesame oil, ad. 100.00 ml.

*Procedure.*—the active ingredient is dissolved in benzyl alcohol and the stirred solution diluted with hot sterilized sesame oil. 1 ml. of this solution containing the ingredients in the above amounts is filled in ampoules which are sterilized at 160° C. for 1.5 hours.

What is claimed is:
1. 7α-methyl-oestradiol of the formula
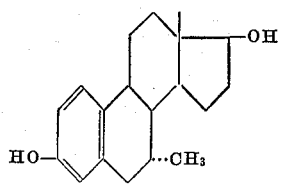
2. The 3-methyl-ether of 7α-methyl-oestradiol.
References Cited by the Examiner
UNITED STATES PATENTS
2,225,419  12/1940  Logemann et al. _____ 260—397
OTHER REFERENCES
Campbell et al.: "Steroids," volume 1, pages 317 to 324, March 1963.
LEWIS GOTTS, *Primary Examiner.*
HENRY A. FRENCH, *Assistant Examiner.*

UNITED STATES PATENT OFFICE
CERTIFICATE OF CORRECTION

Patent No. 3,318,927   May 9, 1967

Georg Anner et al.

It is hereby certified that error appears in the above numbered patent requiring correction and that the said Letters Patent should read as corrected below.

Column 2, formula "(III)" the upper right-hand portion of the formula should appear as shown below instead of as in the patent:

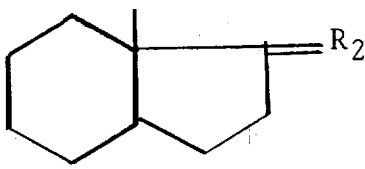

column 5, lines 66 and 67, strike out "sulphate solution and with water, dried and evaporated 2.9 g." and insert instead -- 2.0 g. --; column 8, line 50, for "0.250" read -- 0.025 --.

Signed and sealed this 9th day of January 1968.

(SEAL)
Attest:

EDWARD M. FLETCHER, JR.
Attesting Officer

EDWARD J. BRENNER
Commissioner of Patents